Patented May 14, 1940

2,200,872

UNITED STATES PATENT OFFICE 2,200,872

CONSTRUCTION ELEMENT INCLUDING STRUCTURAL SHAPES AND MEMBERS

Gerald Robert Brophy, Westfield, and Herbert James French, Elizabeth, N. J., assignors to The International Nickel Company, Inc., New York, N. Y., a corporation of Delaware No Drawing. Application January 25, 1939, Serial No. 252,728

6 Claims. (Cl. 75—125)

The present invention relates to special copper steels and constructional elements made thereof, and more particularly to special low alloy copper-nickel-silicon steels of improved weldability and structural rolled shapes and members made thereof.

Heretofore, structural elements made of plain copper steels have been known but when high load carrying ability was required per unit of cross section, these structural elements did not always possess the desired combination of mechanical properties and other characteristics, including those pertaining to manufacturing and weldability as explained more fully hereinafter. Structural elements were often required by the art to possess a yield point in the as rolled condition exceeding 55,000 pounds per square inch so that the strength-weight ratio would be high. The structural elements were likewise required to possess these combinations of qualities in a variety of shapes and sizes both large and small.

The commercial development of welding imposed an additional set of requirements on strong steels for structural members and the like since strong low alloy steels were subject to an undesirable effect known as weld hardenability which tended to create internal stress in the welded parts, often resulting in undesirable distortion and even damage by cracking. Suitable structural elements for welded structures must possess low weld hardenability and good welding qualities in other respects, even under undesirable conditions of operation, such as welding at cold atmospheric temperatures where chilling effects and the tendency for the steel to harden are at a maximum. Furthermore, in order to be useful commercially, the desired combination of qualities must be obtained in structural elements at a moderate cost. Cost factors will include not only the cost of alloying constituents but also the mechanical working properties, manufacturing difficulties, proportion of rejections and scrapped metal, etc.

Steels containing copper alone have been proposed for use in structural applications. Steels of these types which contained appreciable amounts of copper gave rise to manufacturing difficulties such as "surface rotting" in rolling and forging which rendered them commercially unsuitable. The plain copper steels with enough copper to provide yield points in excess of 55,000 or 60,000 pounds per square inch at low carbon contents were susceptible to "surface rotting" in rolling and forging. Steels lower in copper, so that they would not be subject to "surface rotting" in hot working operations, would not meet the required minimum yield points unless the carbon content was raised to percentages adversely affecting welding properties, including weld hardenability.

In an article by F. Nehl in Stahl und Eisen, vol. 53, 1933, p. 773, it was proposed that nickel be added to copper steels in amounts of about 0.5% or more to overcome "surface rotting." In practice, it has been preferred to maintain a nickel-copper ratio equal to or greater than one part nickel to two parts copper. Such copper-nickel alloy steels containing from about 0.75% to 1.5% of copper and about 0.5% to 2% of nickel with normal manganese, silicon, phosphorus and sulfur contents have met minimum yield points of 55,000 pounds per square inch in the thinner sections as rolled, normalized or annealed, but for structures built of sections larger than such thinner sections, or where the higher yield points of 60,000 pounds per square inch are required, carbon has to be present in amounts which produces undesirable weld hardenability and otherwise adversely affects welding qualities. These steels at the specified high yield points exhibited marked weld hardening particularly at low temperatures encountered in outdoor welding operations where chilling intensified undesirable weld hardening. A desirable balance of high yield points of about 55,000 to about 65,000 pounds per square inch minimum and low weld hardenability could not be consistently obtained in the copper-nickel steels in the required ranges of sizes and shapes.

It has been discovered that the presence of silicon in low alloy copper-nickel steels in critical amounts and in balanced relation to the hardening elements including carbon, manganese, nickel, etc., greatly improves the properties of the steels in several respects. Silicon generally has been thought to increase the brittleness of steels. We have discovered that while first additions of silicon increase the weld hardenability, a distinct reversal of effect is obtained upon further additions of silicon within critical limits while not causing detrimental embrittling effects on the steels. If the maximum weld hardness of copper-nickel steels having enough carbon to show appreciable weld hardenability is plotted against the silicon content, the weld hardness approaches a maximum or peak as silicon content increases until a critical silicon content is reached. Beyond this point, the effect of silicon is reversed and weld hardness decreases with further increased silicon content. Thus, silicon raises the amount of carbon which can be tolerated while maintaining an acceptable low weld hardenability. We have found that the presence of balanced proportions of silicon raises the tolerable limits of carbon, manganese and nickel and other elements which promote weld hardening. This permits the use of such alloying elements to build strength and high yield points in steels without the handicap of weld hardenability. We have also found that structural elements made of low alloy steels containing controlled and balanced amounts of copper, nickel and silicon, and controlled amounts of manganese and carbon are particularly suitable for use in building construction and other structural applications, and combine low weld hardenability with high yield point, high yield ratio, high ductility, high impact strength, and other physical properties in the as rolled, normalized and annealed conditions.

It is an object of the present invention to provide improved structural elements made of low alloy structural steel containing controlled and balanced amounts of silicon in relation to weld hardening elements in copper-nickel steels.

It is another object of the present invention to provide improved structural elements made of low alloy copper-nickel-silicon steel which combine low weld hardenability with high strength properties and moderate cost, and which can be economically manufactured into commercial products.

It is a further object of the present invention to provide improved rolled structural elements made of copper-nickel-silicon steels with high strength properties in the as rolled, normalized and annealed conditions, free from "surface rotting," and combining with these qualities low weld hardenability, particularly when the steel is at low atmospheric temperatures such as 5° F. or other sub-freezing temperatures when welded.

The invention contemplates improved weldable structural elements made of low alloy steel containing controlled and balanced amounts of silicon, copper, nickel, manganese and carbon and combining low weld hardenability with high physical properties in the as rolled, normalized and annealed condition.

It is within the contemplation of the present invention to provide improved copper steels which contain controlled and balanced proportions of copper, nickel and silicon and combine low weld hardenability with high physical properties and freedom from "surface rotting" in rolling or forging.

Moreover, it is likewise within the contemplation of the present invention to provide a low alloy copper-nickel steel with a high yield point containing a silicon content so proportioned to the hardening elements that the tensile properties will be approximately the same in the hot rolled, normalized and annealed conditions.

Furthermore, it is also within the contemplation of the present invention to provide improved welded structures made of copper-nickel-silicon steel members with high yield point and ductility, and characterized by low hardnesses in the weld zones.

Other objects and advantages of the invention will become apparent to those skilled in the art from the following description.

According to the present invention, critical amounts of silicon in low alloy copper-nickel steels for use as structural elements are balanced with the weld hardening elements including carbon, manganese, and nickel to produce copper-nickel-silicon steels with improved physical properties and low weld hardenability. Balanced proportions of silicon impart the required strength without materially affecting ductility and directly oppose weld hardenability and counteract the effects of the elements producing weld hardenability to keep weld hardening at a low safe value. The critical percentage of silicon which must be exceeded increases as carbon, manganese and nickel increases. For instance, in a 1.0% nickel, 0.5% manganese, low carbon (0.10), 1% copper steel at least about 0.85% silicon is required to bring weld hardenability below peak values. With larger amounts of carbon, manganese or nickel, singly or in combination, the silicon should be increased. While it is recognized that carbon, manganese and nickel do not have equal hardening effects, as an approximation it may be stated that as the sum of the hardening elements carbon, manganese and nickel exceeds about 1.5%, for every ten points (0.1%) rise above about 1.5% of these elements silicon should be increased approximately ten points (0.1%) above about 0.85% to maintain low weld hardenability, for example, to maintain a Brinell hardness on welding a plate at about 5° F. at less than about 300. As the silicon content increases above about 1.2% the ductility and notch toughness decrease rapidly. Silicon must be present in amounts exceeding about 0.85% but not greatly exceeding about 1.25%. The presence of silicon within these critical limits does not substantially affect the proper nickel-copper ratio to eliminate surface rotting.

In the practice of the present invention, it is preferred to maintain the composition of the special low alloy steel within the approximate ranges given in Table I in accordance with the principles specified hereinabove.

*Table I*

| Element | Percent |
| --- | --- |
| Copper | 0.75 to 1.25 |
| Nickel | 0.5 to 1.5 |
| Silicon | 0.85 to 1.25 |
| Manganese | 0.2 to 0.65 |
| Carbon | 0.15 to 0.05 |

The manganese content will vary within the range specified depending upon the sulfur content and the desired rolling properties which improve with increasing manganese. When the manganese content is in excess of about 0.65%, say about 1%, somewhat superior tensile properties are obtained but this is greatly offset and detrimentally affected by increased weld hardenability. Carbon acts in a similar manner and should not greatly exceed about 0.15% maximum and for lowest weld hardenability should preferably be present in amounts of about 0.12% or less. The strength requirements will generally preclude a carbon content of less than about 0.05%. The presence of hardening elements such as carbon, manganese, and the like, in excess of the specified ranges and in amounts sufficient to affect detrimentally weld hardenability should be accompanied by adequate and proportionate increases in the contents of the counteracting and opposing element silicon in the steel to maintain a proper balance. The nickel-copper ratio should exceed one to two and may preferably be maintained at one to one or two to one. If the proportions of the various alloying elements are exceeded or are not reached either the weldability or the strength properties will suffer, and the required balance of weld hardenability and high strength no longer obtain.

It is preferred to embody our invention in copper-nickel-silicon steels having excellent properties for use as structural elements by maintaining the composition within the ranges given in Table II.

Table II

| Element | Percent |
|---|---|
| Copper | 0.9 –1.1 |
| Nickel | 0.9 –1.25 |
| Silicon | 0.9 –1.1 |
| Manganese | 0.4 –0.6 |
| Carbon | 0.12–0.07 |
| Iron | Balance |

As will be apparent to those skilled in the art, the copper steels may contain the usual impurities and minor constituents found in carbon steel or alloy steel, e. g., sulfur, phosphorus, etc., within the ordinary commercial limits and in accordance with good steel making practice and when we say the "balance substantially all iron" or "iron the balance" in the description and claims we include within the expression such impurities and minor constituents.

Physical properties typical of the steels embodying the present invention for use as improved structural members fall within the approximate ranges given in Table III. The physical properties obtained will depend to some extent on the composition, size, etc., as is well known. In addition to a high yield point, etc., the steels possess a high yield ratio, for instance, in some cases of about 80% or more. Structural elements made of steels embodying the preferred compositions and ratios of the present invention are further characterized by the fact that they are relatively insensitive to different rates of cooling and possess approximately the same tensile properties in the normalized condition as in the annealed condition.

Table III

| Property | Annealed | Normalized |
|---|---|---|
| Tensile strength........p. s. i.. | 70,000–80,000 | 70,000–80,000 |
| Yield point........do.... | 55,000–70,000 | 55,000–70,000 |
| Yield ratio........per cent.. | About 80 | About 80 |
| Elongation........do.... | 35–30 | 35–30 |
| Reduction in area........do... | 65–60 | 65–60 |
| Charpy impact........ft. lb.*.. | 105–70 | 120–100 | p. s. i.=pounds per square inch.
*V notch charpy impact value.

The copper-nickel-silicon structural steels offer a yield point in the as rolled condition exceeding the minimum of 55,000 pounds per square inch, and often exceeding a minimum of 60,000 pounds per square inch, over a wide range of sections. They also possess a low weld hardenability particularly when welded at low temperatures such that the maximum hardness developed on welding a one-half inch plate cooled to 5° F. is 300 Brinell or lower. A suitable weld test to determine weld hardenability is carried out on a six inch by nine inch piece of one-half inch plate. A bead from a three-sixteenths inch steel electrode is laid down the center of the plate surface by the electric arc welding process at a welding speed of about four to six inches per minute. Without any subsequent heat treatment or stress relieving treatment, the plate is then sectioned and the hardnesses determined across the section. In this manner, the maximum hardness in the heat affected zone is readily determined for the steel at the particular atmospheric temperature of the test. Steels made in accordance with the present invention will exhibit a maximum hardness in the as welded condition not greater than about 300 Brinell hardness number when welded at all atmospheric temperatures down to about 5° F.

The composition and physical properties of a copper-nickel-silicon steel for use as a structural member illustrative of the present invention are given in Table IV and Table V. The steel has substantially the same tensile properties in the normalized condition as in the annealed condition.

Table IV

| | Per cent |
|---|---|
| Nickel | 1.0 |
| Silicon | 1.0 |
| Copper | 1.0 |
| Manganese | 0.48 |
| Carbon | 0.11 |
| Iron | Balance |

Table V

| Property | Annealed 1″ round | Normalized 1″ round |
|---|---|---|
| Tensile strength........p. s. i.. | 78,750 | 77,500 |
| Yield point........do.... | 67,000 | 66,500 |
| Yield ratio........ | 0.85 | 0.86 |
| Elongation........per cent.. | 30.5 | 32.5 |
| Reduction in area........do.... | 64 | 60 |
| V notch charpy impact........ft. lb.. | 70 | 106 |
| Brinell hardness on welding at 5° F.* | 290 | |
| Brinell hardness on welding at 65° F.** | 260 | |

*Maximum Brinell hardness welding on 5° F. plate.
**Maximum Brinell hardness welding on 65° F. plate.

The present invention provides as products or articles of manufacture improved structural members having excellent mechanical and physical properties and made of low alloy corrosion resistant copper-nickel-silicon steels having a composition within the ranges hereinbefore specified and characterized by low weld hardenability even when welded at low temperatures combined with high strength properties, including high yield point, yield ratio, ductility, impact resistance, etc., in the as rolled or as worked condition. Thus, the present invention provides, for example, plates, sheets and flats; round and square rods, cores and bars, such as are used in section up to four of five inches or even more for reinforcement and the like; pipes, tubes and tubular products; rolled structural shapes, such as I-beams, channels, angles, etc.; improved welded structures made up of the structural members or elements provided by the present invention either entirely or in part or in combination with structural members or elements having analyses other than that provided by the present invention, the heat affected areas in the weld zones of the improved copper-nickel-silicon members being characterized by a low maximum hardness after welding at atmospheric temperatures, even after welding at low atmospheric temperatures such as 5° F.

Although the present invention has been described in conjunction with preferred embodiments, it is to be understood that modifications and variations may be resorted to without departing from the spirit and scope of the invention, as those skilled in the art will readily understand.

We claim:

1. In articles of manufacture of the class described, plates, sheets, flats, rods, cores, bars, pipes, tubes, tubular products, I-beams, channels, and angles made of a worked copper-nickel-silicon steel substantially immune to surface rotting comprising about 0.75% to about 1.25% copper, about 0.5% to about 1.5% nickel, the ratio of nickel to copper being greater than about 1:2, about 0.2% to about 0.65% manganese, about 0.15% to about 0.05% carbon, about 0.85% to about 1.25% silicon, the silicon content exceeding 0.85% by approximately 0.1% for approximately each 0.1% excess of total carbon, manganese and nickel above 1.5%, and the balance substantially all iron, said steel possessing a yield point in the as rolled condition exceeding about 55,000 pounds per square inch and having weld hardenability such that in the as welded condition the maximum hardness on welding a one-half inch plate of said steel is not greater than about 300 Brinell hardness number when welded at all atmospheric temperatures down to about 5° F.

2. As an article of manufacture, a welded structure comprising a rolled structural element made of copper-nickel-silicon steel comprising about 0.9% to about 1.1% copper, about 0.9% to about 1.25% nickel, about 0.9% to about 1.1% silicon, about 0.4% to about 0.6% manganese, about 0.12% to about 0.07% carbon, and the balance substantially all iron, said silicon content exceeding 0.85% by approximately 0.1% for approximately each 0.1% excess of total carbon, manganese and nickel above 1.5%, and said structural element being integrally welded in said structure and being characterized by low weld hardness in the heat affected area of the weld zone not exceeding about 300 Brinell hardness when welded at temperatures down to about 5° F.

3. As an article of manufacture, a welded structure comprising a worked structural element made of copper-nickel-silicon steel comprising about 0.75% to about 1.25% copper, about 0.5% to about 1.5% nickel, the ratio of nickel to copper being greater than about 1:2, about 0.2% to about 0.65% manganese, about 0.15% to about 0.05% carbon, about 0.85% to about 1.25% silicon, the silicon content exceeding 0.85% by approximately 0.1% for approximately each 0.1% excess of total carbon, manganese and nickel above 1.5%, and the balance substantially all iron, said worked structural element being integrally welded in said structure and being characterized by low weld hardness in the heat affected area of the weld zone not exceeding about 300 Brinell hardness when welded at temperatures down to about 5° F.

4. A low alloy, rolled, structural steel combining high yield point with low weld hardenability and constituted of about 0.9% to about 1.1% copper, about 0.9% to about 1.25% nickel, about 0.9% to about 1.1% silicon, about 0.4% to about 0.6% manganese, about 0.12% to about 0.07% carbon, said silicon content exceeding 0.85% by approximately 0.1% for approximately each 0.1% excess of total carbon, manganese and nickel above 1.5%, and the balance substantially all iron, said steel possessing a yield point in the as rolled condition exceeding about 55,000 pounds per square inch and having low weld hardenability not exceeding about 300 Brinell hardness when welded at temperatures down to about 5° F.

5. A low alloy steel combining high yield point with low weld hardenability and containing in balanced and controlled amounts about 0.75% to about 1.25% copper, about 0.5% to about 1.5% nickel, the ratio of nickel to copper being greater than about 1:2, about 0.2% to about 0.65% manganese, about 0.15% to about 0.05% carbon, about 0.85% to about 1.25% silicon, the silicon content exceeding 0.85% by approximately 0.1% for approximately each 0.1% excess of total carbon, manganese and nickel above 1.5%, and the balance substantially all iron, said steel being in a worked condition and possessing a yield point in the as rolled condition exceeding about 55,000 pounds per square inch combined with low weld hardenability not exceeding about 300 Brinell hardness when welded at temperatures down to about 5° F.

6. In articles of manufacture of the class described, plates, sheets, flats, rods, cores, bars, pipes, tubes, tubular products, I-beams, channels, and angles made of a worked copper-nickel-silicon steel containing about 0.9% to about 1.1% copper, about 0.9% to about 1.25% nickel, about 0.9% to about 1.1% silicon, about 0.4% to about 0.6% manganese, about 0.12% to about 0.05% carbon, and the balance substantially all iron, said silicon content exceeding 0.85% by approximately 0.1% for approximately each 0.1% excess of total carbon, manganese and nickel above 1.5%, said steel possessing a yield point in the as rolled condition exceeding about 55,000 pounds per square inch and having low weld hardenability such that in the as welded condition the maximum hardness on welding one-half inch plate of said steel is not greater than about 300 Brinell hardness number when welded at all atmospheric temperatures down to about 5° F.

GERALD ROBERT BROPHY.
HERBERT JAMES FRENCH.